(12) United States Patent
Vannan

(10) Patent No.: US 7,618,568 B2
(45) Date of Patent: Nov. 17, 2009

(54) MANUFACTURING METHOD FOR A REINFORCED LIQUID ELASTOMER TIRE

(76) Inventor: Frederick Forbes Vannan, 8509 Foxglove Ave. NW., Clinton, OH (US) 44216

(*) Notice: Subject to any disclaimer, the term of this patent is extended or adjusted under 35 U.S.C. 154(b) by 601 days.

(21) Appl. No.: 11/371,298

(22) Filed: Mar. 9, 2006

(65) Prior Publication Data

US 2006/0151916 A1    Jul. 13, 2006

(51) Int. Cl.
| | |
|---|---|
| B29C 39/10 | (2006.01) |
| B29C 45/14 | (2006.01) |
| B29D 30/00 | (2006.01) |
| B29D 30/06 | (2006.01) |
| B60C 9/00 | (2006.01) |
| B60C 9/02 | (2006.01) |
| B60C 9/07 | (2006.01) |
| B60C 5/00 | (2006.01) |
| B60C 5/01 | (2006.01) |
| B60C 19/00 | (2006.01) |

(52) U.S. Cl. .................. 264/145; 152/452; 152/562; 156/125; 264/159; 264/275; 264/328.3

(58) Field of Classification Search .............. 152/452, 152/562; 156/125; 264/275, 328.3, 145, 264/159
See application file for complete search history.

(56) References Cited

U.S. PATENT DOCUMENTS

| | | | |
|---|---|---|---|
| 2,790,994 A | * | 5/1957 | Cardot et al. .......... 264/159 X |
| 2,930,425 A | | 3/1960 | Lugli et al. |
| 3,229,013 A | | 1/1966 | Newton et al. |
| 3,578,057 A | | 5/1971 | Knipp et al. |
| 3,815,652 A | | 6/1974 | Pouilloux |
| 3,956,448 A | | 5/1976 | Larson |
| 4,140,165 A | | 2/1979 | Lapeyre |
| 4,231,410 A | | 11/1980 | Vannan, Jr. |
| 4,259,129 A | * | 3/1981 | Schmidt .................. 156/125 |
| 4,277,295 A | | 7/1981 | Schmidt et al. |
| 4,287,930 A | | 9/1981 | McIntosh et al. |
| 4,453,993 A | | 6/1984 | Rau et al. |
| 4,476,908 A | | 10/1984 | Cesar et al. |
| 4,657,718 A | * | 4/1987 | Sicka et al. |
| 4,711,284 A | | 12/1987 | Schmidt |
| 4,731,137 A | | 3/1988 | Schmidt et al. |
| 4,917,744 A | | 4/1990 | Knipp et al. |
| 5,292,472 A | * | 3/1994 | Tompkins |
| 6,974,519 B2 | | 12/2005 | Steinke et al. |
| 2002/0033220 A1 | | 3/2002 | Steinke |

* cited by examiner

Primary Examiner—Adrienne C Johnstone

(57) ABSTRACT

This invention pertains to a new method for manufacturing tires, an apparatus used with the new method and the article manufactured by the new method. The article is called the reinforced liquid elastomer tire (RLET). The method of manufacture includes placement of reinforcing materials inside a tire molding cavity and subsequently surrounding the reinforcement with a liquid elastomer which encapsulates the reinforcement and takes the outside shape of the tire mold. The liquid elastomer is solidified and the completed RLET is removed from the mold and ready for service.

2 Claims, 14 Drawing Sheets

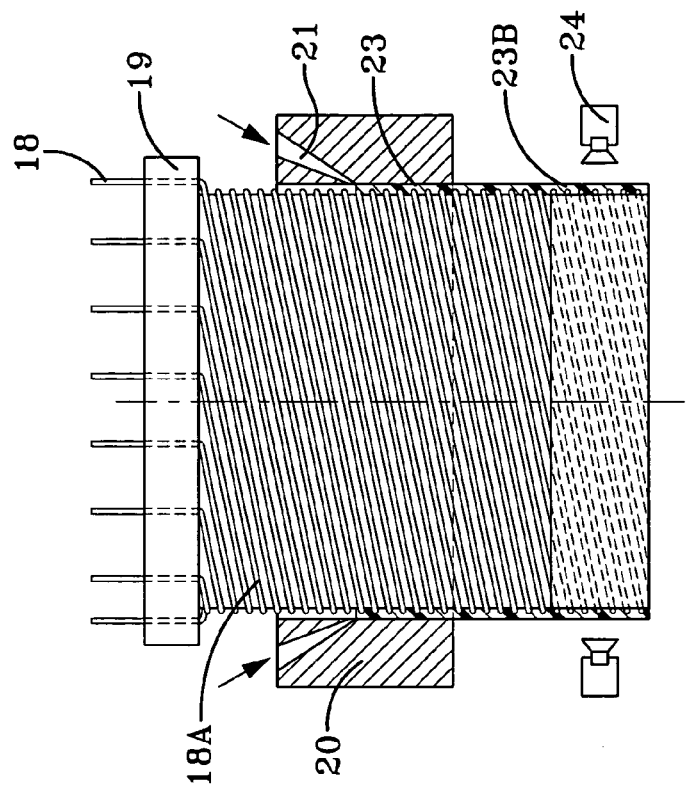
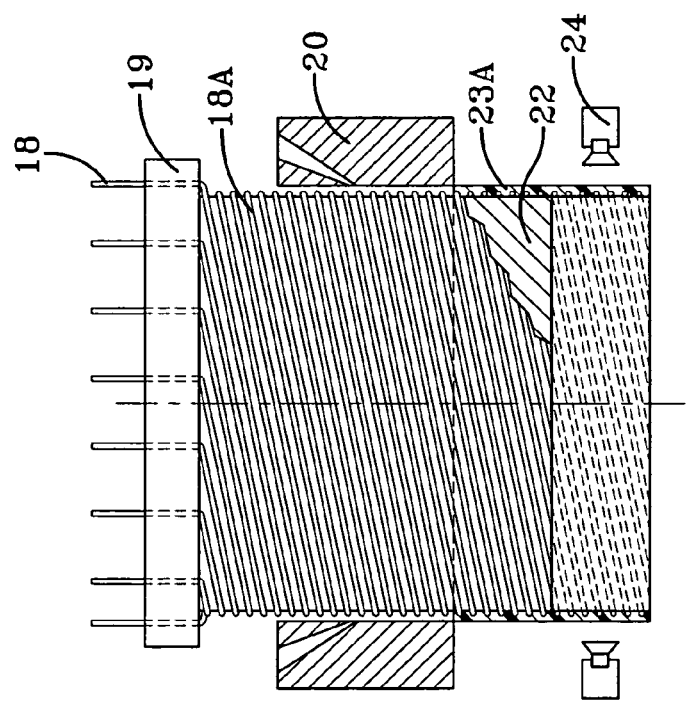

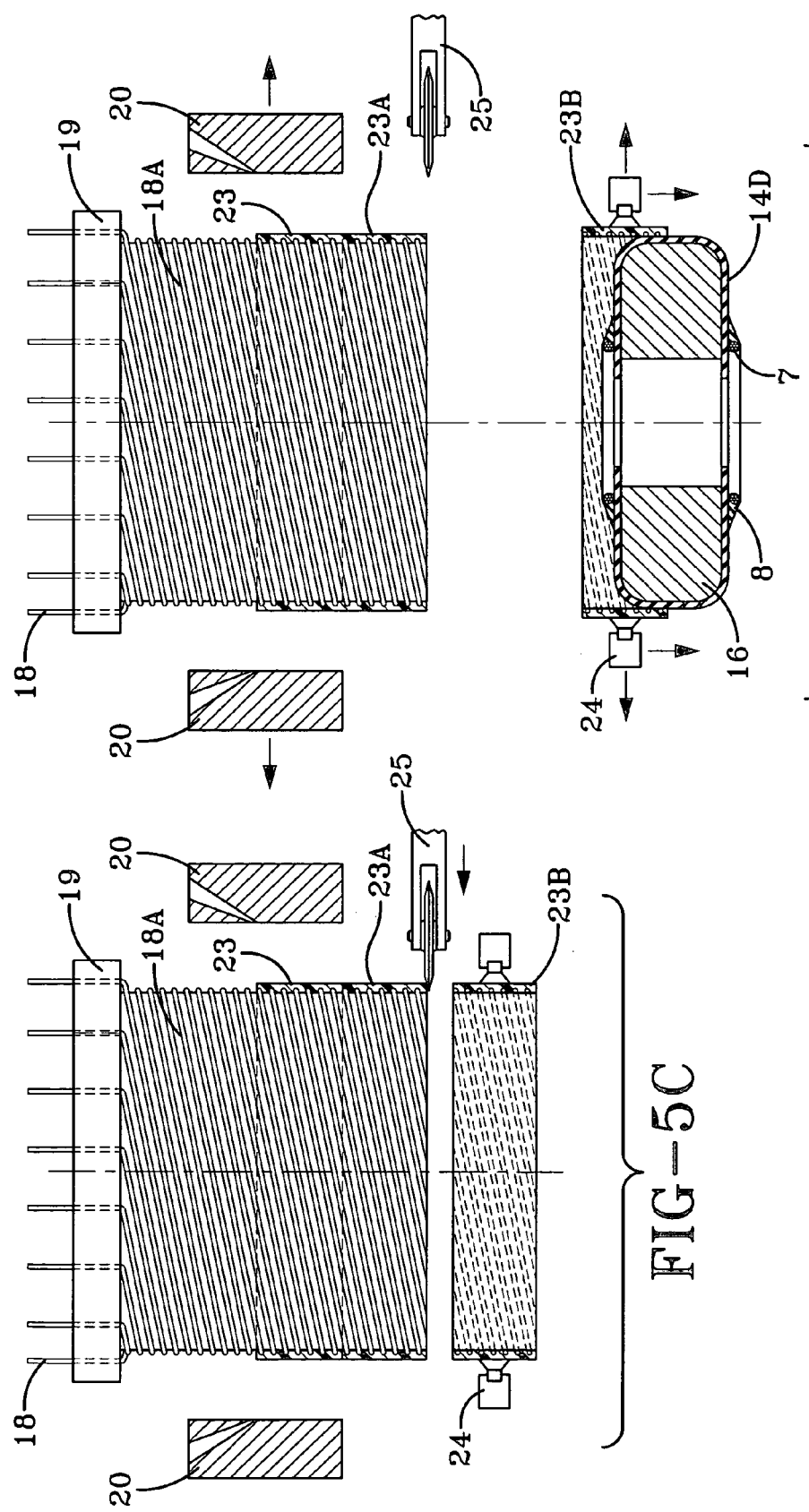

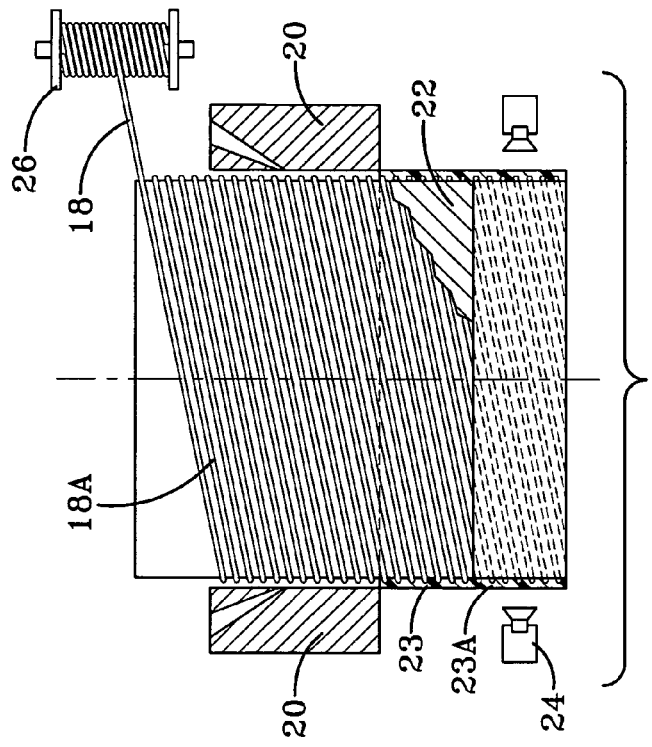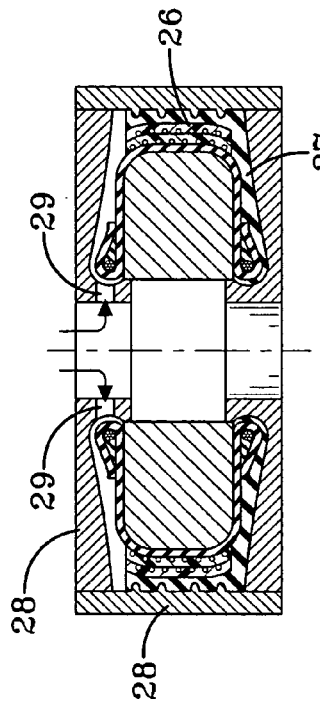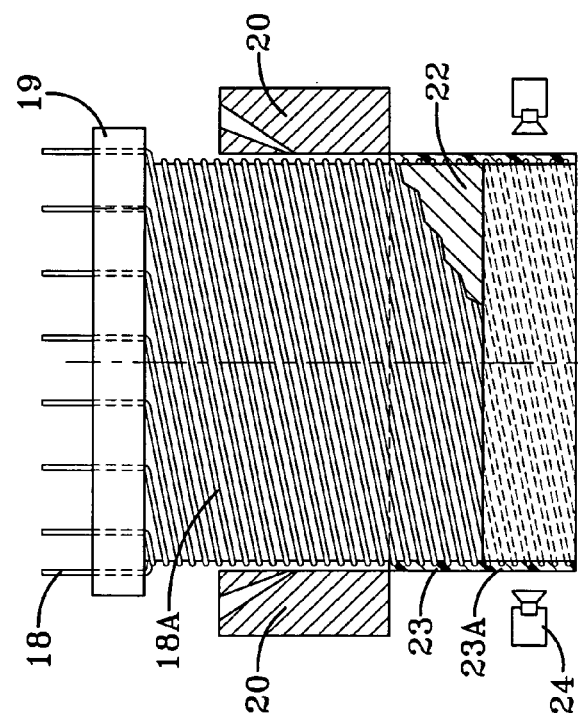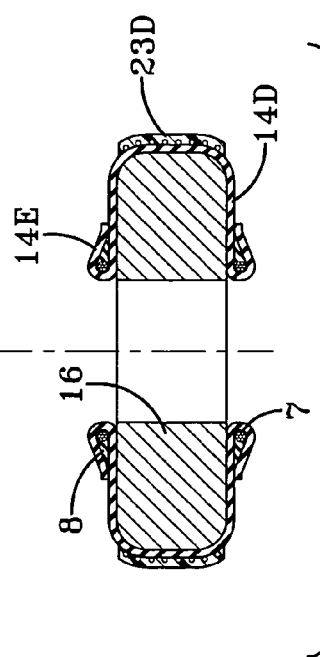
FIG-5F
FIG-5G
FIG-5E

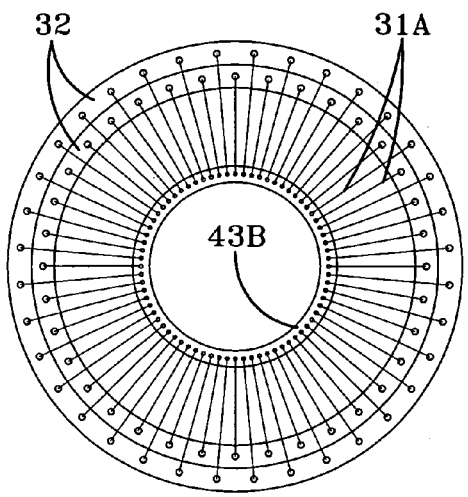
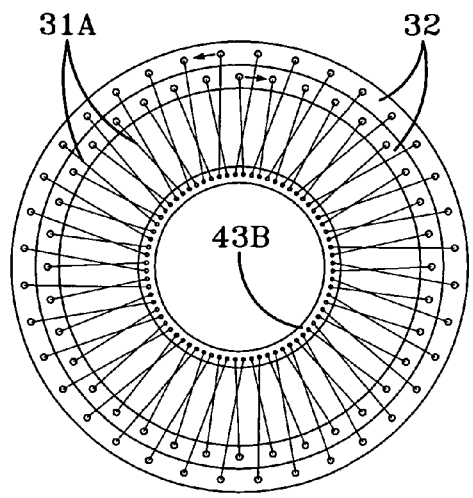
FIG-7A  FIG-7B
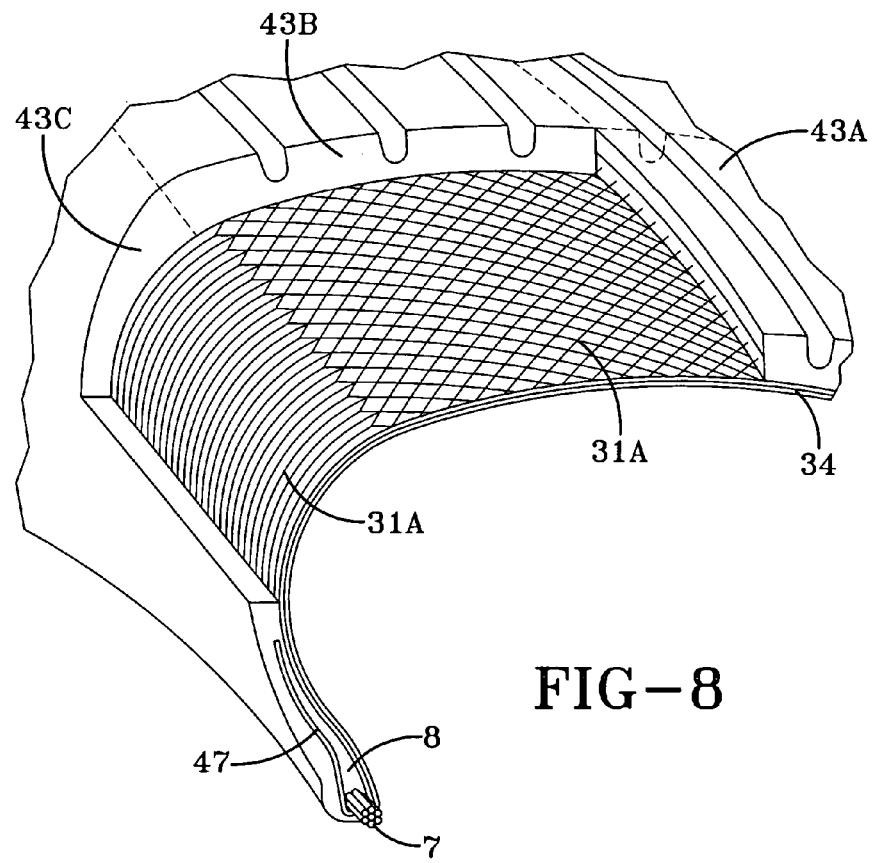
FIG-8

MANUFACTURING METHOD FOR A REINFORCED LIQUID ELASTOMER TIRE

BACKGROUND

The invention relates to a method of manufacturing a tire in which the reinforcing members are surrounded by a liquid elastomer which is then solidified. It is called the reinforced liquid elastomer tire (RLET).

This method of manufacture enables an improved structural tire design which is included in the invention.

The invention also includes an apparatus to manufacture a reinforced liquid elastomer tire (RLET).

Tires have been manufactured for many years by similar methods. Most tires have been made from either natural or synthetic rubber and reinforcing fibers, cables and metals.

Traditionally rubber is mixed in a banbury, solid rubber components are formed with extruders or calendars, fabric or wire reinforcement components are coated with solid rubber using calendars or extruders, and then all solid rubberized components are assembled into an unvulcanized tire and subsequently placed in a hot mold having the shape of the finished tire and vulcanized under pressure for the appropriate period of time.

Mixing solid rubber in a banbury is energy intensive and does not disperse and distribute the solid materials as well as liquids can be mixed. Additionally, high horsepower banbury mixers are quite expensive compared with liquid mixers. Solid component forming extruders and calendars are also highly energy intensive and expensive and are not required for the RLET.

The solid rubber components are traditionally assembled one or two at a time on tire building machines which are inefficient, labor intensive, expensive and not required for the RLET.

The vulcanization reaction required to make rubber tires requires a high pressure curing press, high temperature molds and takes significant time. The RLET does not require the expensive and time-consuming vulcanization process.

The traditional tire manufacturing process using individual solid components limits the tire designer's freedom to design the ultimate performing tire. It is impossible to exactly control ply angle and belt angle along each cord or to exactly control all dimensions of components or finished tires. A traditional rubber tire must be shaped into a vulcanization mold. As internal pressure forces the tire to expand to conform to the mold, the solid rubber components move uncontrollably and ply and belt angle change uncontrollably. All of the uncontrollable variables associated with the traditional manufacturing process which detract from tire performance can be eliminated with the RLET.

Traditional tires made with solid rubber components can potentially have air entrapped between components or poor adhesion between components. It is possible to eliminate both air entrapment and component adhesion problems with the RLET improving overall tire durability and performance.

DESCRIPTION OF PRIOR ART

Most prior art relating to liquid elastomer tires does not include provisions for reinforcement of the elastomer. Cast polyurethane tires have been successful for low speed applications such as bicycles, scooters, hand trucks, lawn and garden, golf cart and solid tow motor or forklift tires. Many of these applications require no internal inflation pressure to carry the load.

When inflation pressure or higher speeds are required, then reinforcement of the elastomer is necessary to control dimensional shape and growth and to resist centrifugal force. Typical tire applications requiring inflation pressure include: recreational vehicles, motorcycles, motor scooters, automobiles, light trucks, SUV's, medium trucks, heavy trucks, busses, agricultural vehicles, earthmovers, and air craft.

There is extensive prior art related to heavy-duty cycle tires requiring inflation pressure or high speeds utilizing reinforcements and manufactured with solid rubber components whereas this invention relates to liquid elastomer components.

There is limited prior art relating to reinforced liquid elastomer tires. Also the concept has never been successfully reduced to practice prior to this invention.

SUMMARY OF THE INVENTION

The object of the invention is to improve durability, ride, and overall performance, recycling ability and manufacturing efficiency of tires by replacing traditional solid rubber components with a reinforced liquid elastomer. The reinforced liquid elastomer tire (RLET) improves interfacial adhesion between reinforcing components and greatly reduces the possibility of air trapped between components.

The RLET is compatible with all reinforcement materials. The tire design may be traditional including separate reinforcement components such as plies, belts and beads or a non-traditional integral reinforcing structure combining the functions of plies, belts and beads.

The principle of the liquid elastomer tire manufacturing process is to hold the reinforcing materials in the desired position while liquid elastomer is applied around them and subsequently is at least partially solidified. This process can be accomplished in one step inside a tire mold or in multiple steps where each step forms a single component or multiple components.

If multiple steps are used, the components are at least partially solidified and assembled and then elastomer in the liquid state is applied around the other components usually inside a tire mold.

Figure 1:
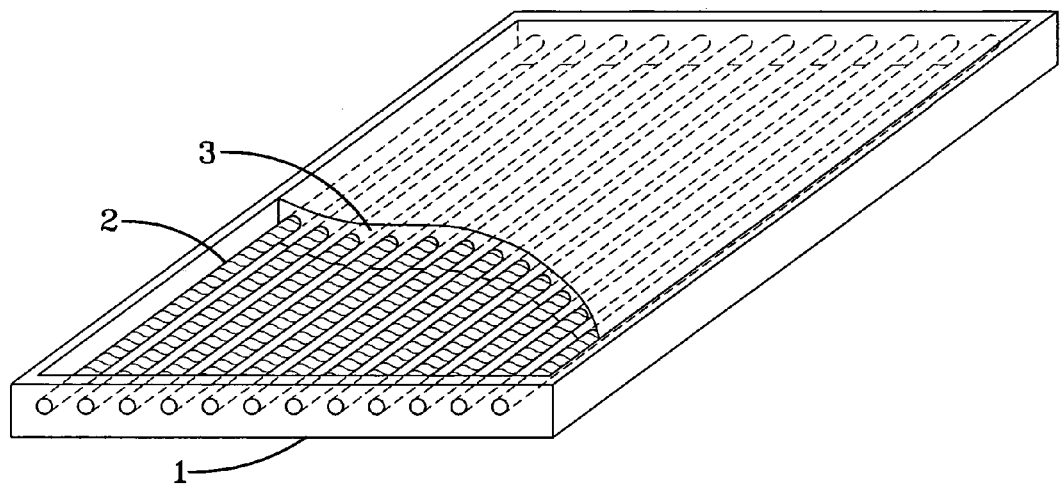
FIG. 1—this drawing shows a pouring tray (1) used to coat reinforcing ply cords (2) with liquid elastomer (3.).
Figure 2:
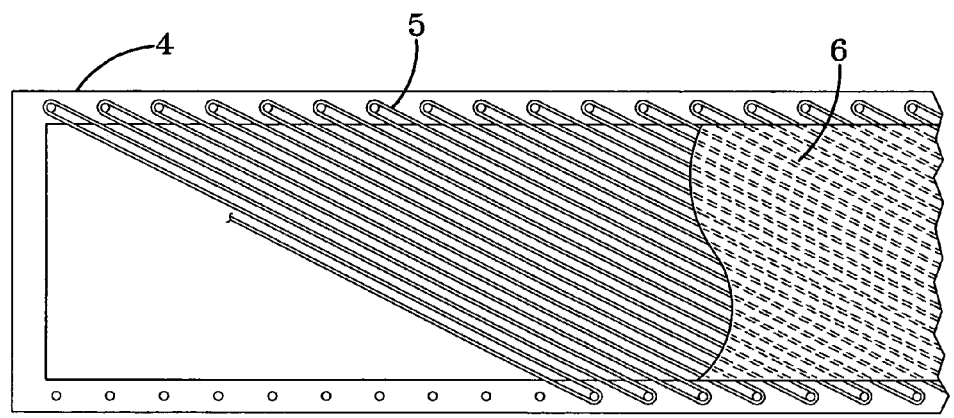
FIG. 2—This drawing shows a pouring tray (4) used to coat belt cords or wires (5) with liquid elastomer (6).
Figure 3:
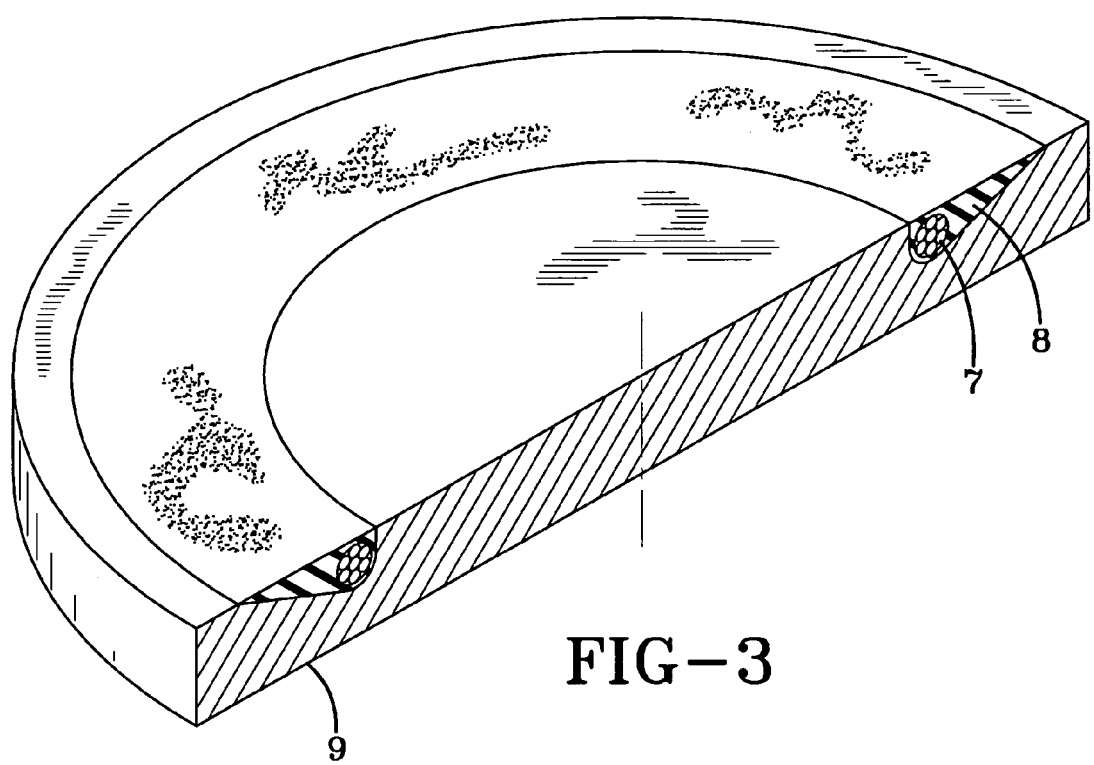
FIG. 3—This drawing shows a metal or fabric bead (7) supported in a mold (9) with liquid elastomer poured or injected around the bead and taking the shape of the mold to form the apex (8) and bead composite.
Figure 4:
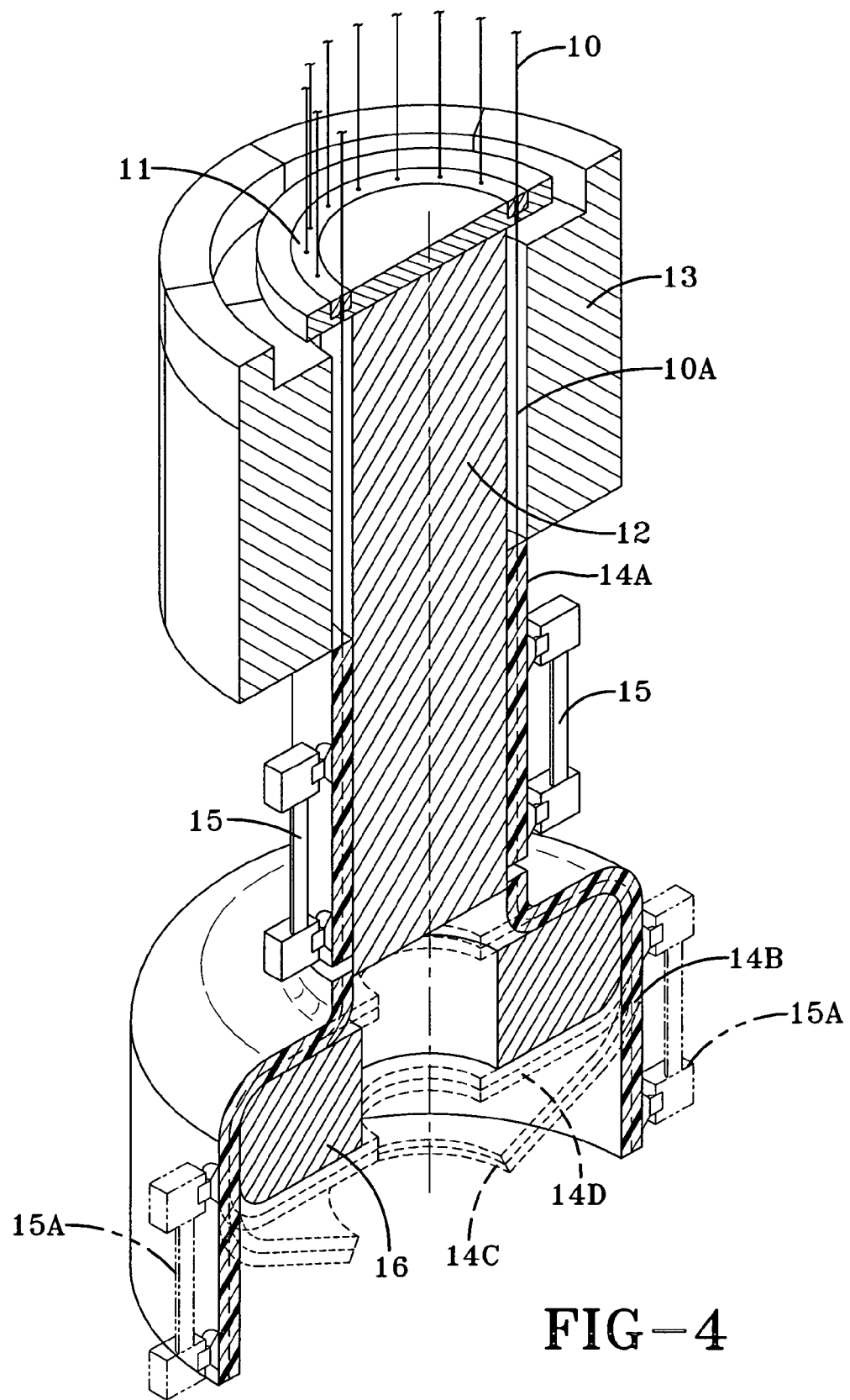
FIG. 4—this drawing shows a ply forming apparatus through which ply cords or wires (10) are held in a cyclindrical array (10A) by a circular organizing die (11) while liquid elastomer is poured or injected around them. The cyclindrical array of ply cords is surrounded by a molding cavity to shape the coated ply. The molding cavity is comprised of a core (12) to shape the inside ply surface and segments (13) to shape the outside ply surface.
Figure 4A:
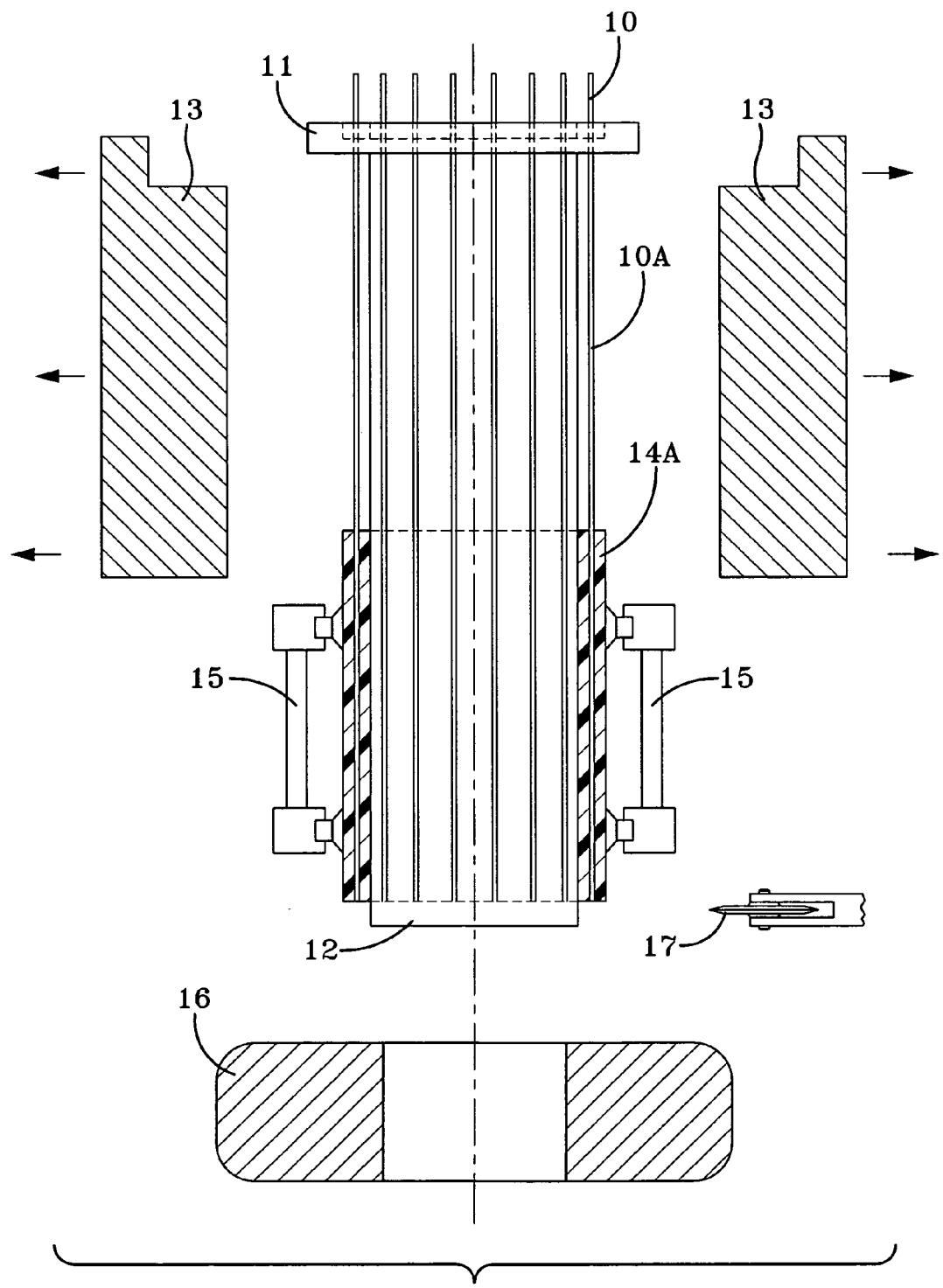

After the liquid elastomer solidifies the outer mold segments (13) are expanded as shown in FIG. 4A and a ring of suction cups or a vacuum cage (15) aided by internal air pressure expands the cyclindrical ply band (14A) diametrically releasing it from the core (12) and moving it downward along the core (12).

As the solidified ply band is moved downward by the vacuum ring new ply cords (10) are pulled through the organizing die (11) and into the molding cavity as shown in FIG. 4A.

Figure 4B:
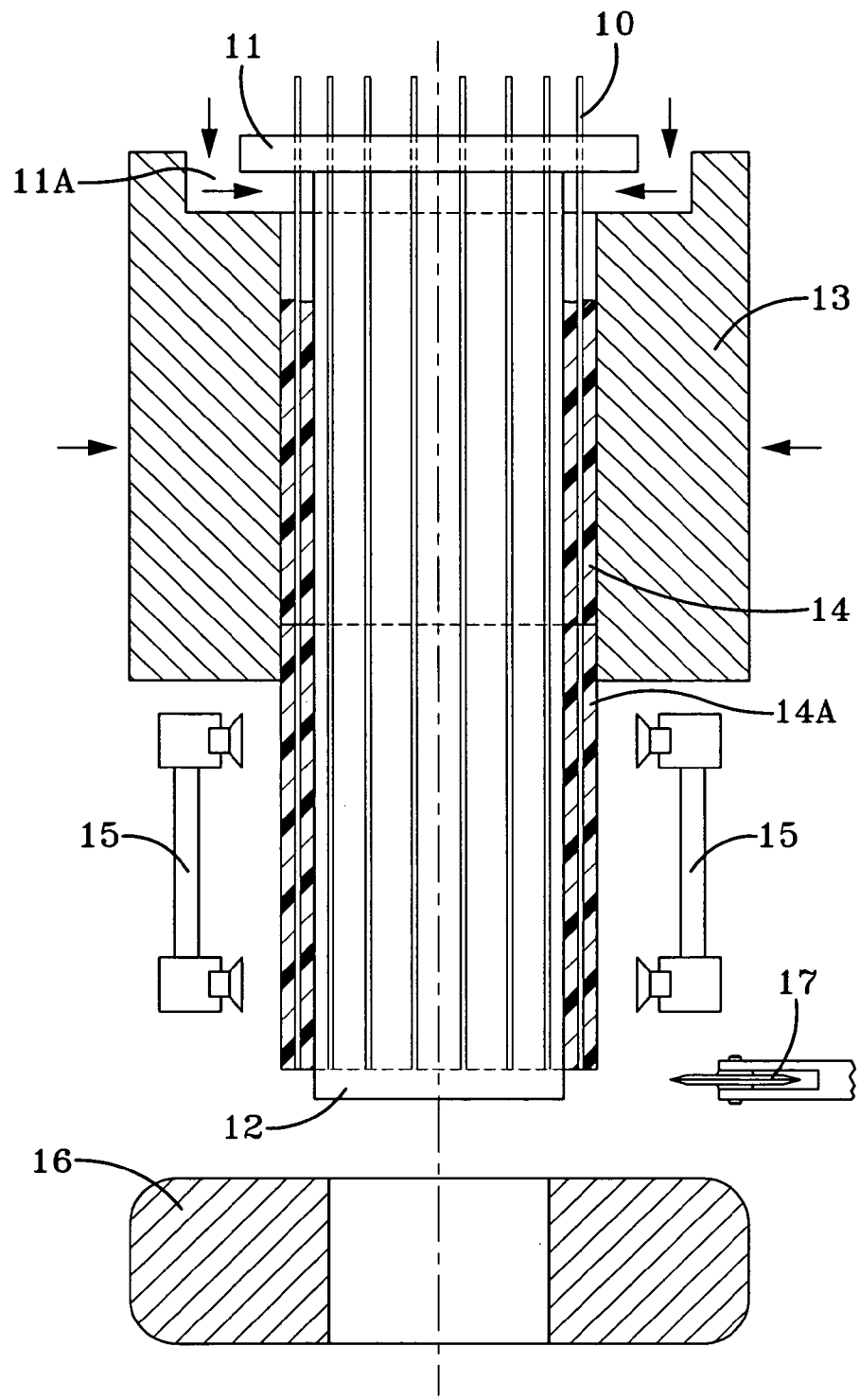

FIG. 4B—This drawing shows the outer mold segments (13) in the closed position forming a mold cavity around the ply cords (10) and closed at the bottom by the preceding ply band. Liquid elastomer is poured or injected through channels (11A) into the ply-molding cavity forming a cyclindrical solidified ply band (14).

Figure 4C:
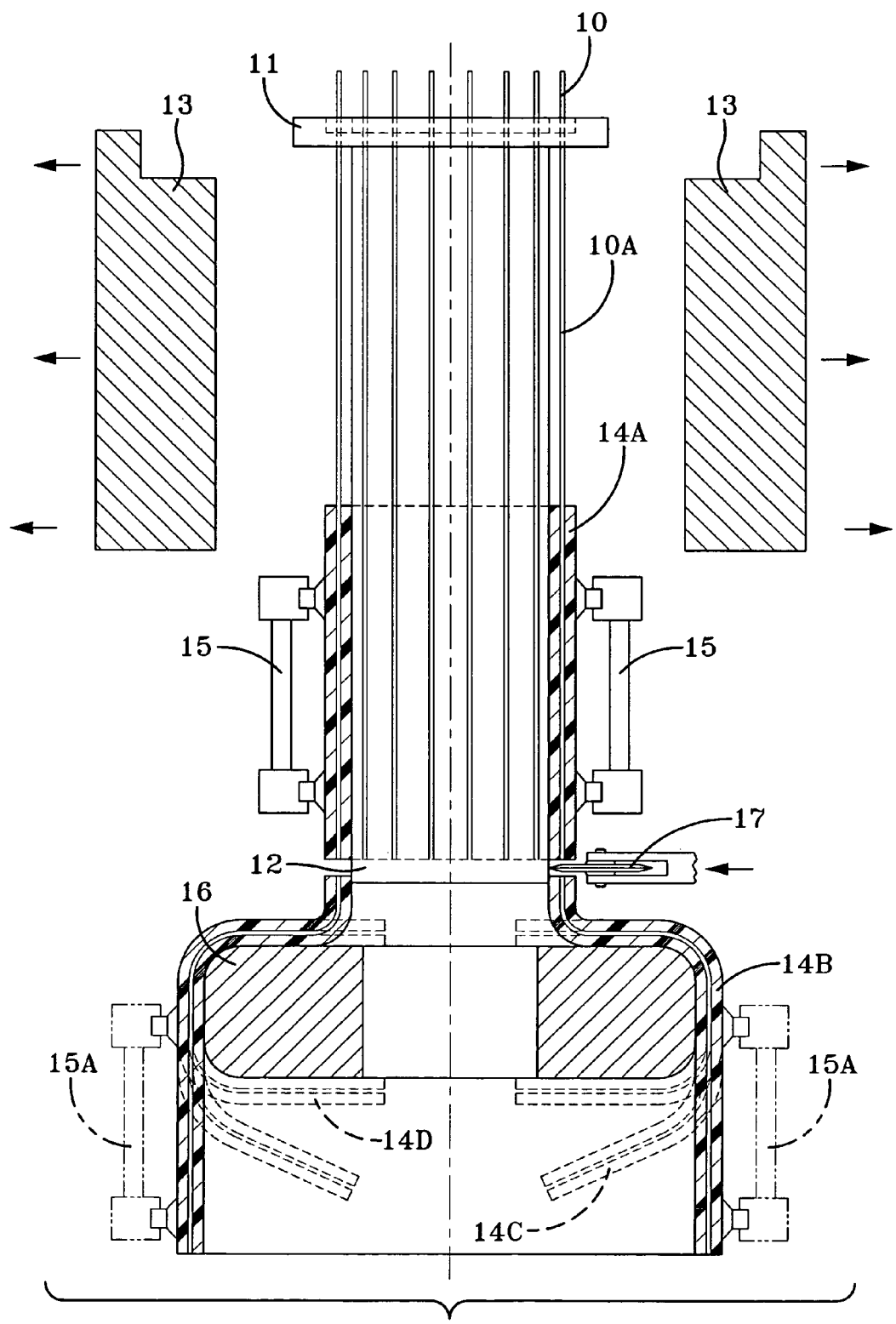

FIG. 4C—This drawing shows the solidified ply band (14) being expanded by the vacuum ring (15) and moved downward to position (15A) over shaping mandril (16). The vacuum ring then releases the ply band to shrink elastically to conform to the mandril's shape. Intermediate positions of the bottom side of the ply band are shown by (14C) and (14D) successively.

FIG. 5A—This drawing shows the first step in making a liquid elastomer coated cyclindrical belt band. The belt wires, cables or cords (18) are positioned with equal spacing between wires by an organizing die (19). The belt wires (18) are connected to a cylindrical support core (22) and the support core is rotated pulling more belt wire (18) through the organizing die (19) and causing the belt wires (18) to move to a specified bias angle relative to the core (22). Outer mold segments (20) are closed radially forming a cavity around the bias angled belt wires.

FIG. 5B This drawing shows liquid elastomer being poured or injected around belt wires (18) into tube mold cavity which is closed at the bottom by the previous belt band (23A).

FIG. 5C—This drawing shows the outer mold segments (20) expanded from the solidified belt band (23A) and the vacuum ring (24) expanding slightly with internal air assistance moves the cylindrical belt band (23B) downward. Then the cutting system (25) cuts through the belt band (23B) separating it from the next belt band (23A) in sequence.

FIG. 5D—This drawing shows belt band (23C) being applied over ply band (14D) which is supported by shaping-mandril (16). Additional belt bands can be formed and applied with the same method (FIG. 5G-26). FIG. 5D also shows the apexed bead subassemblies comprising bead (7) and apex (8) applied on top and bottom sides of the ply band (14D).

FIG. 5E—This drawing shows the ends (14E) of ply band (14D) turned up around the beads (7) and apexes (8) attaching the ply band to the beads. This drawing shows two bead assemblies per tire but more could be used.

FIG. 5G—This drawing shows a multi-piece tire forming mold (28) closed around the ply and belt bands forming a cavity into which liquid elastomer is poured or injected through channels (29). When the liquid elastomer solidifies it forms the outer surface of the tire (27). Multiple formulations of liquid elastomer can be used around the cross-section of the same tire. The following examples are offered: 1. A longwearing, low hysterisis material could be used in the tread area; 2. A high-flex fatigue material could be used in the sidewall area; and 3. a chaffing-resistant material could be used in the bead area.

FIG. 5F—This drawing shows an alternate method of applying belt wires (18A) to the cylindrical core (22). Belt wire (18) is let off of spool (26) and guided onto the core (22) at the specified bias angle relative to the core (22). The rest of the process is the same as depicted in FIGS. 5A, 5B, 5C, 5D, 5E, and 5G except the circular organizing die (19) is not required.

FIGS. 6A, 6B, 6C, 6D, 6E, 7A, 7B, and 8 show a second method of manufacture for a RLET and a novel fire structure made possible by this method, for example a method of manufacturing fires wherein fiber, wire, cord, and/or cable reinforcing materials are continuously fed into a fire molding cavity having the finished fire shape, liquid elastomer is poured or injected into the molding cavity surrounding the reinforcing materials, which can have any desired path and angles relative to the circumferential fire center line, the liquid elastomer subsequently solidifies holding the reinforcing materials in the desired position within the fire molding cavity, the mold is then opened and the finished fire is pulled out of the mold but is still connected to the reinforcing materials which are pulled into the molding cavity as the finished fire is pulled out of the mold, the completed fire is subsequently separated from the following fire being molded and the process is repeated continuously in assembly line fashion.

Figure 6A:
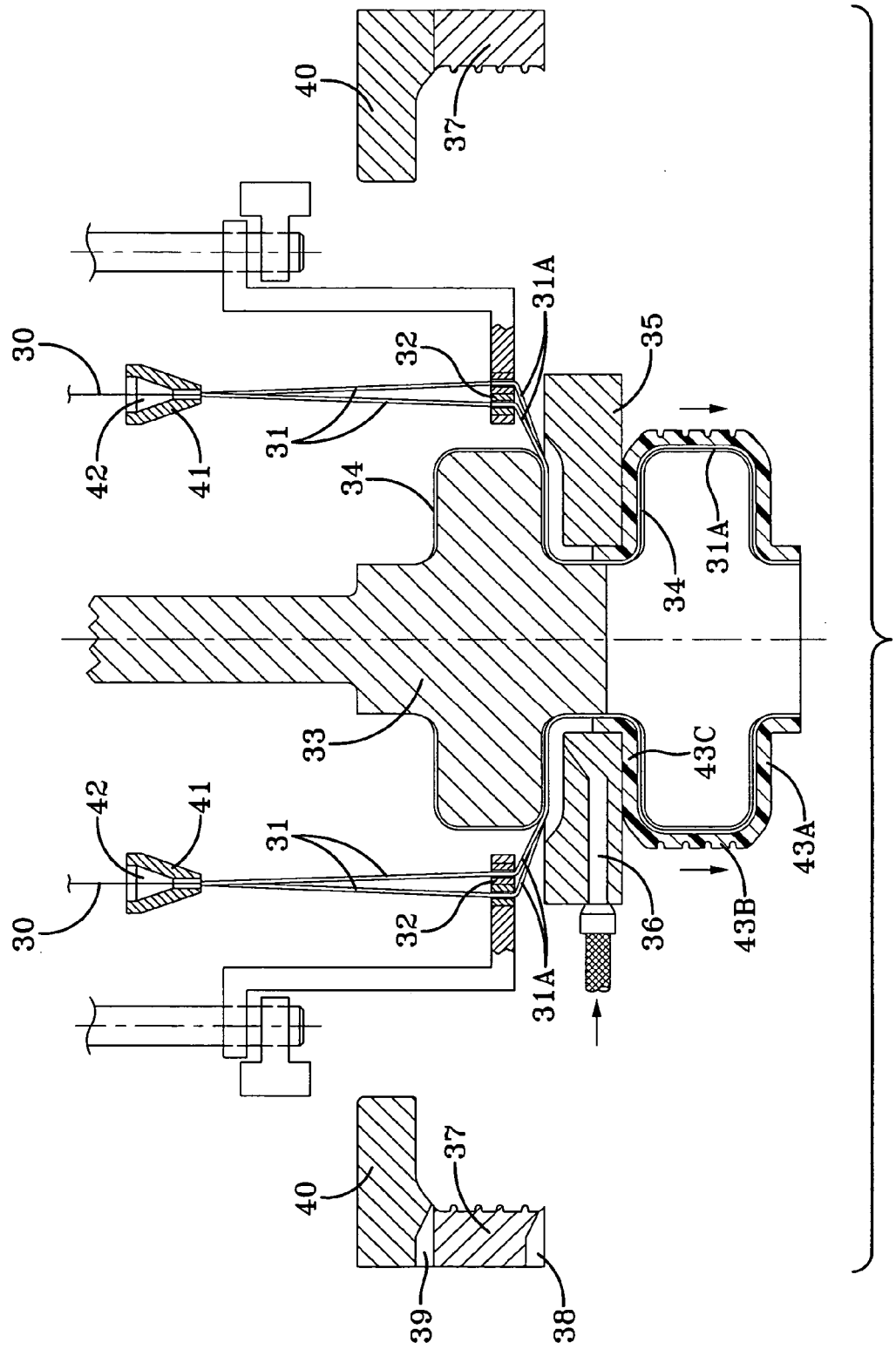

FIG. 6A—This drawing shows uncoated cords, wires or cables (30) passing through an organizing and insulating die (41) where the cords are spaced equally in a circle and they are coated with liquid elastomer (42). When the liquid elastomer coating the cords has at least partially solidified, the coated cords (31) pass through a counter-rotating organizing die (32) which-places alternate cords into two concentric cyclindrical arrays so that one cylindrical array is radially inside the other as shown in FIG. 6A item 31A.

A low air permeable liner (34) made of liquid elastomer is molded or sprayed onto the tire-shaping core (33) and at least partialy solidified.

The counter-rotating organizing die (32) positions the insulated cords (31A) over the liner (34) supported by the core (33) in the lower sidewall area of the tire. With zero counter rotation of die (32) the insulated cords (31A) take a radial cord path which has a 90 degree angle relative to a circumferential line around the tread center line of the tire. If a bias angle is desired in the lower sidewall, the die (32) is counter rotated to permit alternate cords to follow a cord path which has less than a 90-degree angle relative to the circumferential tread centerline. Adjacent cords (31A) have opposite angles with this configuration. One cord (31A) has a left angle when the tire is viewed from the side and the adjacent cords (31A) have right angles.

Variations in the relative angular velocity of the counter-rotating die (32) will provide any cord path desired by the designer including a continuously varying cord path with angles varying from zero degrees to 90 degrees relative to the circumferential tread centerline.

Figure 6B:
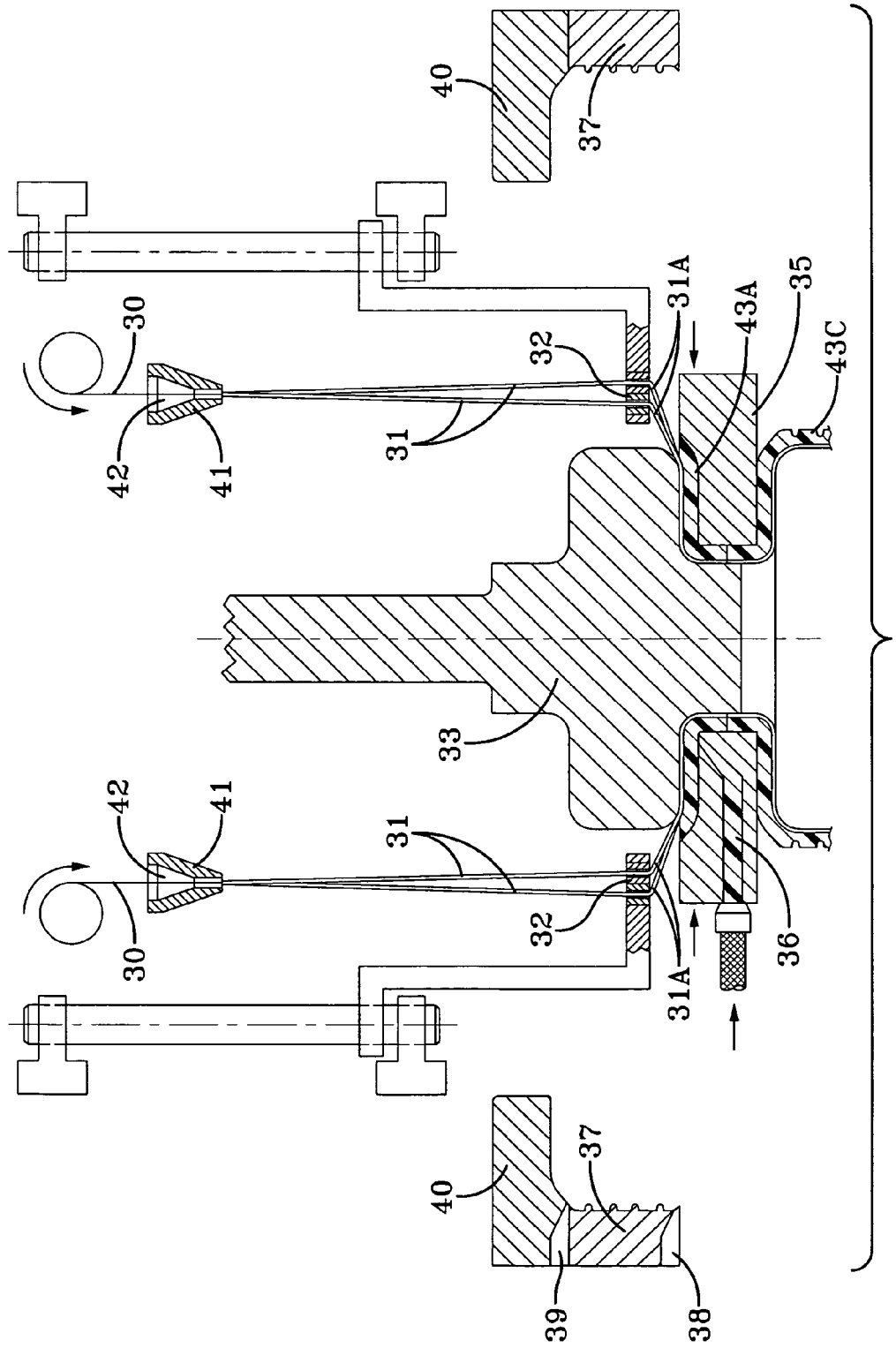

After the counter-rotation organizer die (32) has positioned the insulated cords (31A) in the lower sidewall in FIG. 6A the lower sidewall mold segments (35) are closed and liquid elastomer (43A) is poured or injected through channels (36) and at least partially solidified to hold the cords (31A) in place along the desired cord path as shown in FIG. 6B. The sidewall-mold segments (35) can have the shape of the finished tire sidewall or an in-process shape. The in-process shape allows enough liquid elastomer to cover cords (31A) to hold them in place. Liquid elastomer can be applied without a mold to hold the cords in place, then at least partially solidified and then molded to the finished sidewall shape at a later stage in the process.

Figure 6C:
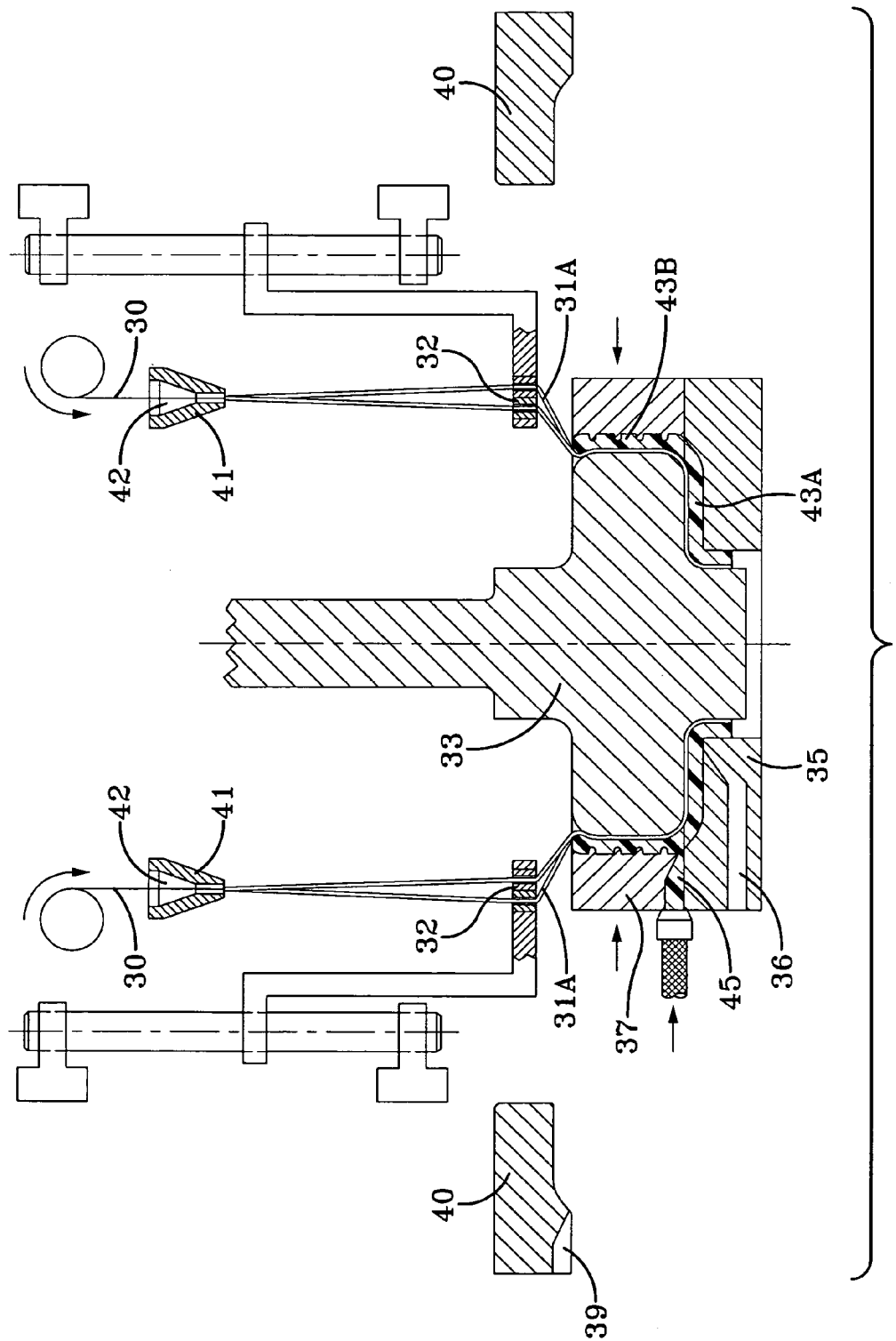

The insulated cords (31A) are then positioned to any desired angles relative to the circumferential tread centerline by the counter rotating organizing die (32) across the crown area of the tire as shown in FIG. 6C, the mold segments (37) are closed and enough liquid elastomer (43B) is poured or injected through channels (45) to at least cover the cords (31A) and hold them in place as the liquid elastomer at least partially solidifies. This process can be accomplished without a mold and then molded to the finished tread shape at a later stage of the process.

Figure 6D:
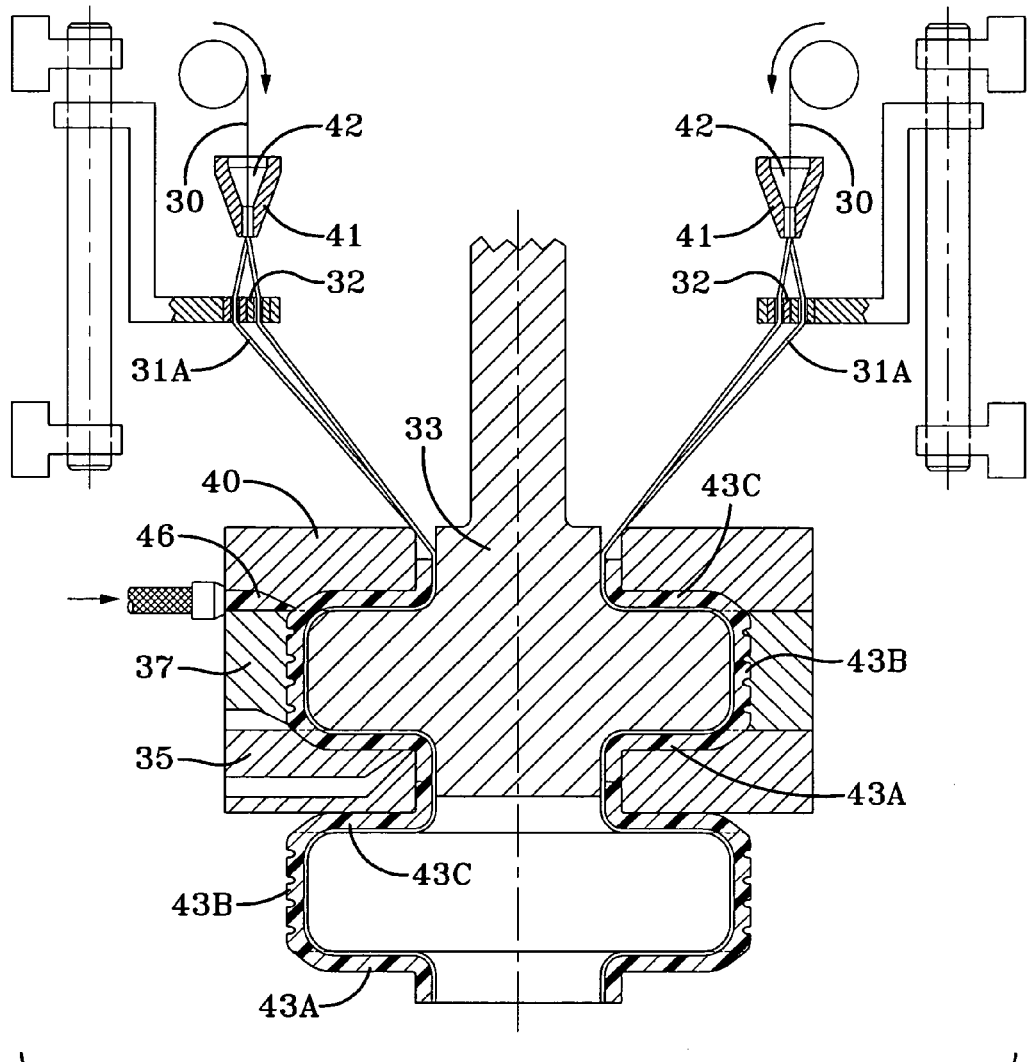

The insulated cords (31A) are then positioned to any desired angles relative the circumferential tread centerline by the counter-rotating organizing die (32) in the upper sidewall area of the tire as shown in FIG. 6D, the mold segments (40) are closed and enough liquid elastomer (43C) is poured or injected through channels (46) to at least cover the cords (31A) and hold them in place as the liquid elastomer at least partially solidifies. This process can be accomplished without a mold and them molded to the finished upper sidewall shape at a later stage of the process.

FIG. 7A—This drawing shows a side view of the insulated cords (31A) held in a radial cord path, 90 degrees to the circumferential tread centerline by the counter rotating die (32) during the formation of the sidewall area of a RLET.

FIG. 7B This drawing shows a side view of the insulated cords (31A) held in a bias angled cord path relative to the circumferential tread centerline by the counter-rotating die (32) during the formation of the sidewall area of a RLET.

Figure 6E:
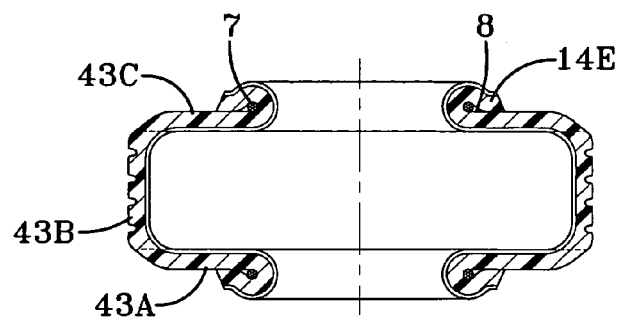

The second method of manufacture of a RLET can now follow the same processing stages as the first method of manufacture shown in FIGS. 5E and 5G to arrive at FIG. 6E which shows a finished tire manufactured with the second method.

FIG. 8—This drawing shows one construction of RLET possible with the second method of manufacture. Radial ply cords (31A) in the sidewall area become bias-angled belt cords (31A) in the crown area forming an integral ply-belt reinforcement eliminating the separate plies and belts of the first method of manufacture. All cord paths and angles relative to the circumferential tread centerline are possible with the second method including curved cord paths which transition smoothly from radial in the bead area to circumferential in the crown area.

Either method of manufacture can be used to produce tires for all applications, of all constructions and designs, with all liquid elastomers, with or without inflation pressure and with or without beads.

DESCRIPTION OF THE PREFERRED EMBODIMENTS

Although there are potentially numerous tire designs, constructions, structures and materials included in this patent the preferred embodiments are described below.

Although there are potentially numerous variations of the method and apparatus of this patent to manufacture the RLET, the preferred embodiments are described below.

The preferred liquid elastomer is polyurethane. Polyurethane's are produced by combining polyols and isocyanates, which are both liquids, with other chemicals to produce a rubber-like solid. Polyurethane's can be formulated to perform equal to, or better than, rubber tires and are more environmentally friendly and the polyurethane manufacturing process is safer for humans.

All types of fiber or wire or cable reinforcing materials can be used in the RLET including steel, rayon, nylon, polyester, Kevlar, fiberglass and carbon fiber.

There are two preferred tire designs for the RLET and each design requires a different method of manufacture and a different apparatus.

The first preferred design simulates traditional solid component rubber tires. A cross-section view through this RLET design can appear to be identical to a rubber tire having at least one ply, belts and beads for reinforcement. The only visible construction difference between this RLET design and traditional rubber tires is that component boundaries are less visible and do not exist between elastomeric components.

The first preferred RLET design can be produced with a process involving several steps. First the reinforcing components including plies, belts and beads are coated with liquid elastomer. The liquid elastomer is poured or injected around the reinforcing materials and at least partially solidified. The partially solidified liquid elastomer will adhere well to the adjacent components whether they are also partially solidified or in the liquid state.

Once the individual reinforcement components are coated with liquid elastomer and the elastomer is at least partially solidified; the coated reinforcing components can be cut to desired angles, spliced and assembled with other components. Then elastomer in the liquid state is poured or injected around the reinforcing components either inside a mold having the approximate shape of the completed tire or another shape or without a mold of any type.

Centrifugal force or injection pressure or gravity can be used to move the liquid elastomer into its desired location when forming components or subassemblies or the completed tire.

The second preferred RLET design replaces the traditional plies and belts of a radial tire with an integral ply-belt structure where the same reinforcing cord, wire, or cable performs the function of a ply cord and simultaneously performs the function of a belt wire. The RLET cord is positioned approximately radially in the sidewall area of the tire like a traditional ply cord but the same cord takes a different path in the crown or tread area of the tire like a belt wire in a traditional tire. The cord path changes from substantially radial in the sidewall area to more circumferential at a bias angle in the crown area like a traditional belt or breaker. Adjacent cords have alternate left and right bias angles similar to the left and right belt angles of a radial tire.

The angle of each cord can be precisely controlled along every increment of its cord path; therefore, a smooth transition between a radial-like cord path in the sidewall and a bias path in the crown area is possible. This smooth transition as well as the elimination of belt endings substantially improves the structural integrity and durability of the tire. Belt endings and abrupt angle changes cause stress concentrations and inter-laminar shear between adjacent belt edges and between belt edges and the ply component in traditional solid component tire.

Ply cord path and belt cord path cannot be controlled along every increment of cord path in traditional solid component tires because traditional tires are assembled from individual solid components on a building drum or core and subsequently expanded into a tire mold forcing the cords to pantograph, changing cord angles and belt widths. The ply and belt cords of a traditional tire take the path of least resistance as they move from the building drum into the mold. No tire today has exactly the optimum cord path along its entire cord length because of this phenomenon. Only with a reinforced liquid elastomer tire is it possible to position all reinforcements exactly where the design engineer specifies and it is possible to exactly control cord angle and placement along each increment of cord length.

The preferred apparatus to manufacture the integral ply-belt RLET design includes the following equipment:
 1. Individual creel let off for each cord or cable
 2, Individual cord liquid elastomer-insulating die
 3. Counter-rotation circular organizing die to position the cords 4. Toroidal mandril whose cross-section has the profile of the inside of the finished tire
5. Multiple piece mold having the shape of the outside of the finished tire
6. Polyol-isocyanate mixer and pouring system
7. Bead winding and application system The preferred method to produce the RLET includes the following processing steps:

1. Individual cords or cable are let off individual tension controlled creels.
2. Each cord is coated with liquid elastomer using an insulating die
3. The liquid elastomer coating the cords at least partially solidifies.
4. The coated cords pass through a counter-rotating organizing die and over the toroidal mandril.
5. The ply cords for the first side of the tire are positioned in the bead area and progressing through the sidewall area to the shoulder of the tread area.
6. The counter-rotating organizing die does not rotate to position the radial ply cords.
7. The mold section which forms the outside of the first sidewall area is moved into position and liquid elastomer is poured or injected around the cords between the mandril and the first sidewall mold section.
8. The liquid elastomer is at least partially solidified holding the cords in place along a radial cord path to function like ply cords in a traditional radial tire.
9. The organizing die is counter-rotated as the cords are positioned from the tread shoulder area on the first side through the crown area to the tread shoulder on the second side to be formed, changing the cord path from radial in the sidewall area to alternately left and right bias angles across the crown area of the tire to function as the belts of a traditional tire.
10. With the counter-rotating die stationary, the mold sections which form the outside of the tread area of the tire are moved into position and liquid elastomer is poured or injected around the cords between the mandril and the outside tread area mold.
11. The liquid elastomer in the tread area adheres to the partially solidified elastomer in the first sidewall area.
12. The liquid elastomer in the tread area is at least partially solidified holding the cords in place at alternately left and right bias angles.
13. With rotation of the organizer die stopped, the die positions the cords radially from the tread shoulder area through the sidewall area down to the bead area of the second side of the tire to be formed.
14. The mold section which forms the outside of the second sidewall area is moved into position and liquid elastomer is poured or injected around the cords between the mandril and the second sidewall mold section.
15. The liquid elastomer in the second sidewall area adheres to the partially solidified elastomer in the tread area.
16. The liquid elastomer in the second sidewall area is at least partially solidified holding the radial ply cords of the second sidewall area in place.

RLET designs can include beads to attach the tire to a wheel or the RLET can be made without beads and use other means to attach the tire to a wheel.

If beads are used with the RLET they can be applied with two different methods:

A—Beads may be positioned adjacent to the coated ply cords in the lower sidewall area on each side of the tire prior to liquid elastomer introduction in the sidewall area making the beads an integral part of the tire reinforcing structure. The mandril is segmented or collapsible for finished tire removal.

B—The RLET Which is at least partially solidified is removed from the mandril and beads are attached to each side by any bonding method but including pouring or injecting liquid elastomer around the beads and lower sidewall ply cords inside a molding device.

The invention claimed is:

1. A method of manufacturing tires wherein fiber, wire, cord and/or cable reinforcing materials are continuously fed into a tire molding cavity having the finished tire shape, liquid elastomer is poured or injected into the molding cavity surrounding the reinforcing materials, which can have any desired path and angles relative to the circumferential tire center line, the liquid elastomer subsequently solidifies holding the reinforcing materials in the desired position within the tire molding cavity, the mold is then opened and the finished tire is pulled out of the mold but is still connected to the reinforcing materials which are pulled into the molding cavity as the finished tire is pulled out of the mold, the completed tire is subsequently separated from the following tire being molded and the process is repeated continuously in assembly line fashion.

2. The method of claim 1 wherein the following steps are included:
   A. A low air permeable liner made of liquid elastomer is applied on to a tire shaping core and at least partially solidifies, the fire shaping core and a plurality of mold segments forming the tire molding cavity;
   B. Reinforcing materials pass through an insulating die which coats each of the reinforcing materials with liquid elastomer which at least partially solidifies;
   C. The coated reinforcing materials pass through an organizing die which positions them and has the ability to counter-rotate adjacent reinforcing materials forming bias angles between adjacent reinforcing materials;
   D. The organizing die positions the insulated reinforcing materials radially or bias angled over the liner supported by the core in the lower sidewall area of the tire molding cavity;
   E. The lower sidewall mold segments are closed and liquid elastomer is poured or injected into the lower sidewall area of the tire molding cavity and is at least partially solidified;
   F. The organizing die positions the insulated reinforcing materials to any desired angles across the crown area of the tire;
   G. The crown area mold segments are closed and liquid elastomer is poured or injected into the crown area of the molding cavity and is at least partially solidified;
   H. The organizing die positions the insulated reinforcing materials radially or bias angled over the liner supported by the core in the upper sidewall area of the tire molding cavity;
   I. The upper sidewall mold segments are closed and liquid elastomer is poured or injected into the upper sidewall area of the tire molding cavity and is at least partially solidified;
   J. The completed tire, core and mold are heated if necessary until the fire is completely solidified;
   K. The completed tire and its supporting core are removed from the mold;
   L. The completed tire and its supporting core are separated from the following tire being molded and its supporting core;
   M. The supporting core is removed from the completed and separated fire.

* * * * *